INVENTOR
LESLIE S. MUNCK
BY Robert Harding Jr.
ATTORNEY

Feb. 28, 1950 L. S. MUNCK 2,498,700

TELEPRINTER EXCHANGE SYSTEM

Filed July 24, 1945 4 Sheets-Sheet 2

INVENTOR
LESLIE S. MUNCK

BY Robert Harding Jr.
ATTORNEY

TELEPRINTER EXCHANGE SYSTEM

Filed July 24, 1945 4 Sheets-Sheet 3

INVENTOR
LESLIE S. MUNCK
BY Robert Harding Jr.
ATTORNEY

Feb. 28, 1950 L. S. MUNCK 2,498,700

TELEPRINTER EXCHANGE SYSTEM

Filed July 24, 1945 4 Sheets-Sheet 4

INVENTOR
LESLIE G. MUNCK
BY Robert Harding Jr
ATTORNEY

Patented Feb. 28, 1950

2,498,700

UNITED STATES PATENT OFFICE 2,498,700

TELEPRINTER EXCHANGE SYSTEM

Leslie Stampe Munck, Croydon, England, assignor to Creed and Company Limited, Croydon, England, a British company Application July 24, 1945, Serial No. 606,725
In Great Britain July 26, 1944

7 Claims. (Cl. 178—4)

This invention relates to automatic exchange systems for teleprinters. Such systems have been described, for example, in the Post Office Electrical Engineers' Journal, volume 29, page 217, "Automatic teleprinter switching," and in prior British Patent No. 512,827 of 1939.

Among the objects of the invention are to relieve teleprinter operators of all operations incidental to the establishing and clearing of connections through a switching system, leaving keyboard manipulation as the sole operational labour, enable operators to increase their rate of traffic distribution, thus lessening the labour costs per message, and to reduce the busy hour peaks at automatic exchanges, as well as save the labour of manual routing of stored messages at storage points.

Automatic teleprinter exchanges in use up to the present rely on connection between teleprinter stations being set up by means of telephone dial selection, preceded by an exchange "call" signal. After a connection is established, the identity of the station selected is verified and, on conclusion, a "clear" is sent to break down the connection. These operations, at present, have to be performed by a teleprinter operator for every change in destination, on apparatus separate from the keyboard, and the time taken reduces the rate of message dissipation. By performing these operations automatically, the speed of message dissipation will be solely dependent on typing speed. The arrangement to be described allows all traffic allotted to an operator to be dispatched entirely by keyboard manipulation at a normal typing speed; furthermore, the messages are prepared on teleprinter keyboard perforators, so that no cadence restrictions are imposed on the operator. The automatic dispatching arrangement performs the functions of setting up the calls, transmitting the messages and clearing the connection without any attention being required from the operator. The operator, in effect, types message text continuously at her natural speed for the duration of her duty.

The dispatcher is described for one teleprinter position on one line to an exchange, but this is no limitation. Any number of lines and any number of teleprinter positions may be connected by a concentration circuit to a smaller number of the described arrangements.

A teleprinter exchange, having overflow storage receiving reperforator circuits, could be provided with this arrangement, so that stored messages could be automatically forwarded to the required destination without the necessity for reading a printed transcription of the perforated tape, or for breaking the tape and routing each portion to different circuits. This would have an important economic effect on the design of a teleprinter exchange, since it would level the traffic peaks on which the immediate capacity of an exchange is based.

The device, without the circuit for converting the arhythmic call signals into dial impulses, could be used for connection to manual teleprinter exchanges fitted with overflow reperforator positions.

Manual and automatic exchange could be interlinked as desired, the message always being reproduced, with its identity, at intermediate points without any special operations on the part of the manual exchange switchboard operator.

The several features of the invention are defined in the claims at the end of this specification.

The invention will be described with reference to the accompanying drawings, in which.

Figure 2:
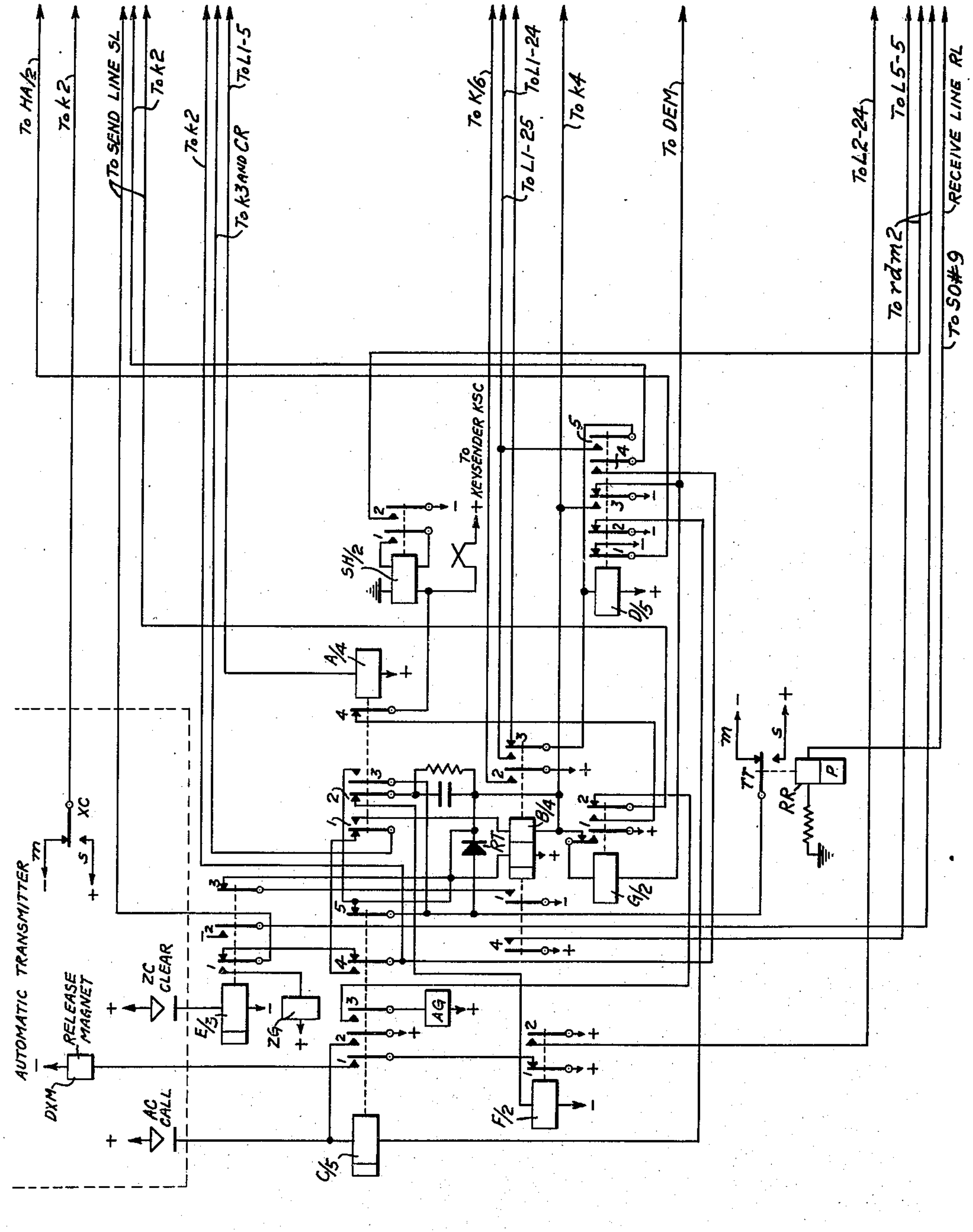
Fig. 2 is a detailed circuit diagram pertaining to the automatic transmitter and the control circuit of Fig. 1.
Figure 3:
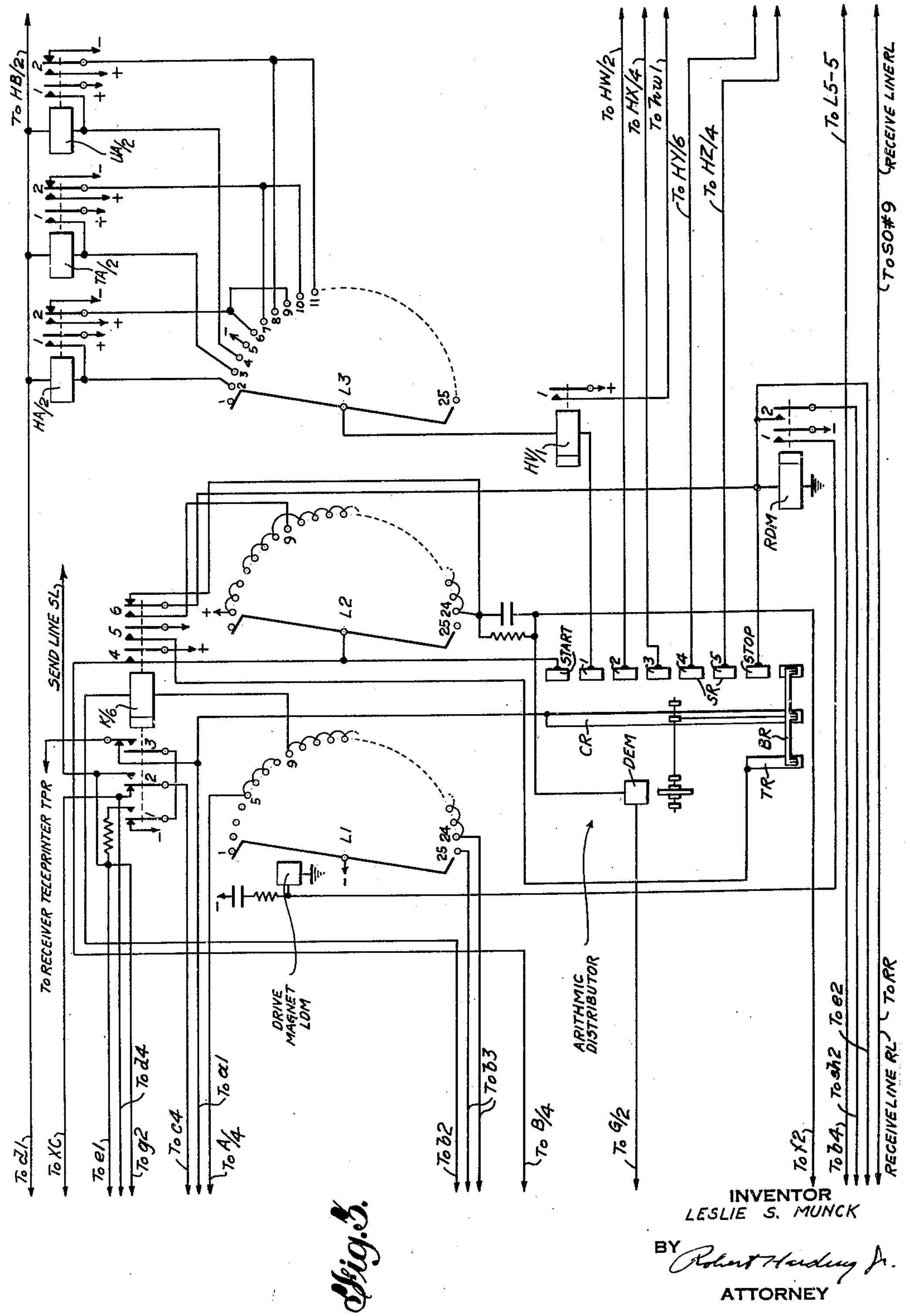
Fig. 3 is a detailed circuit diagram pertaining to part of the storage circuit of Fig. 1.
Figure 4:
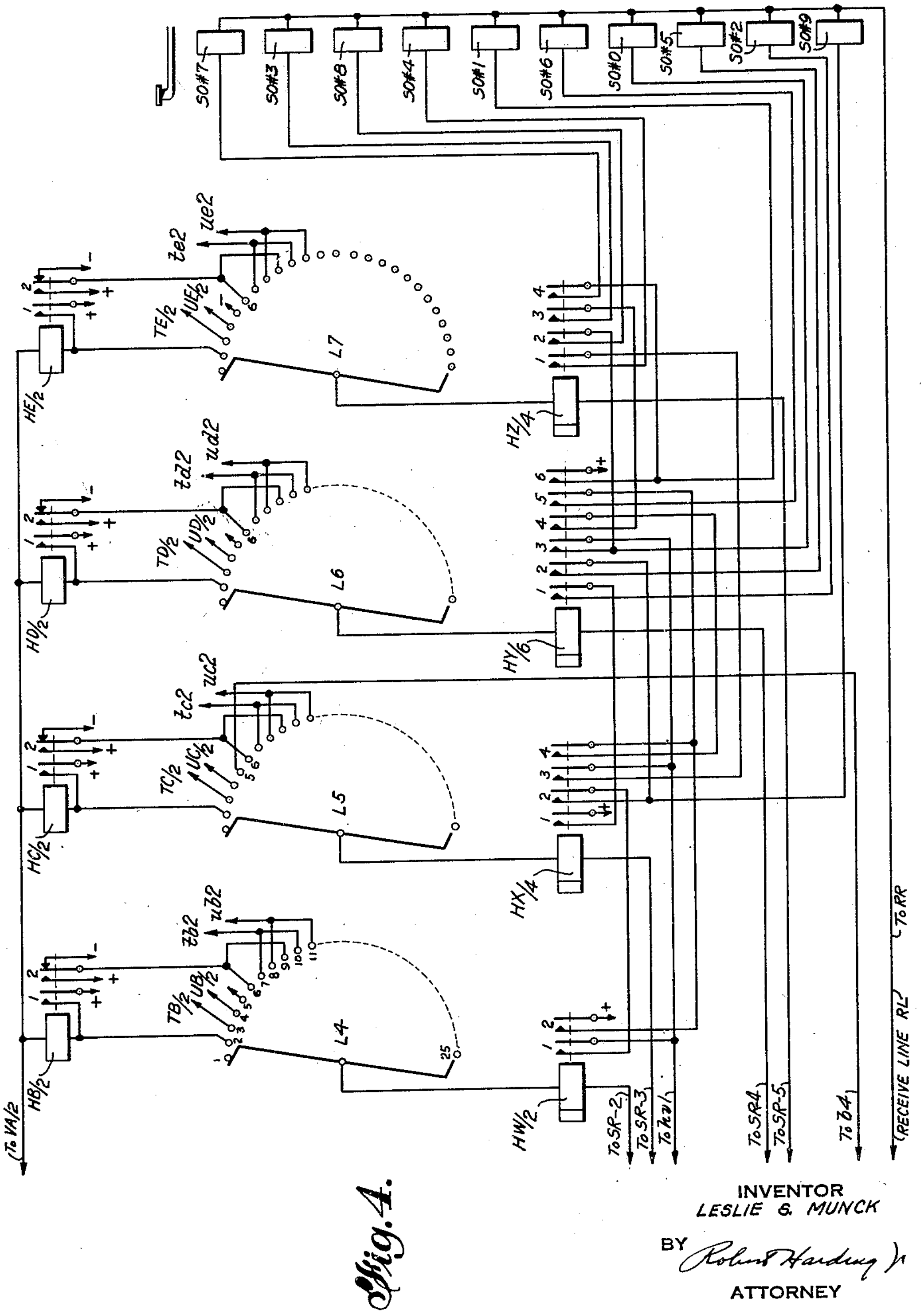
Fig. 4 is a detailed circuit diagram pertaining to the remainder of the storage circuit and the converter circuit of Fig. 1.

In the drawings Fig. 3 is designed to join Fig. 2 at the left hand end thereof and Fig. 4 is joined to Fig. 3 at the right hand end of Fig. 3. To facilitate the tracing of circuits which extend over the three sheets of wiring diagrams 2, 3, 4 the connections joining the diagrams have been identified by placing the reference numeral of the contact first encountered when going from one sheet to another.

Figure 1:
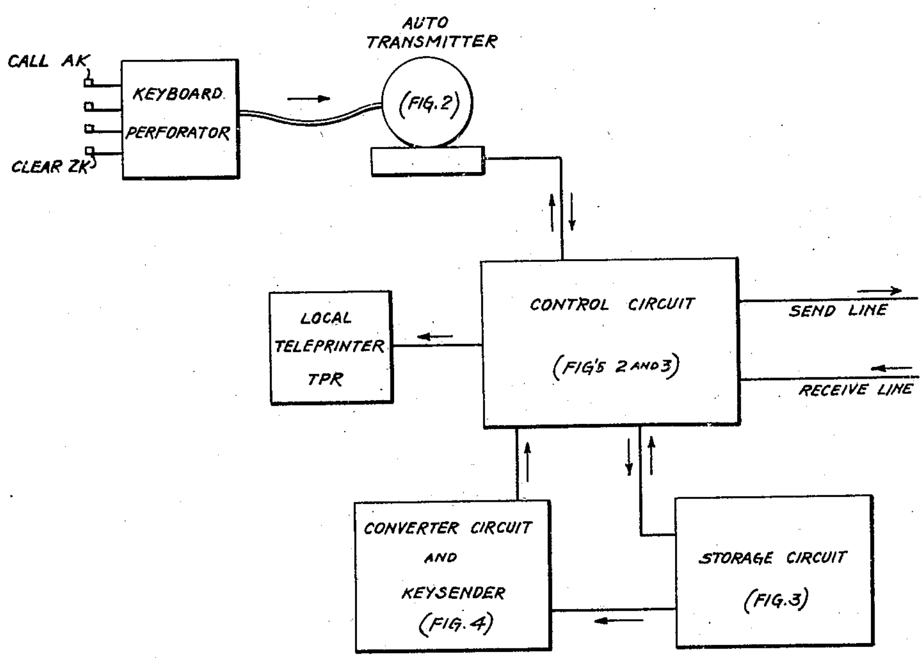
Fig. 1 is a block schematic relating to an out-station in an automatic telegraph exchange system in accordance with the present invention.
Figure 5:
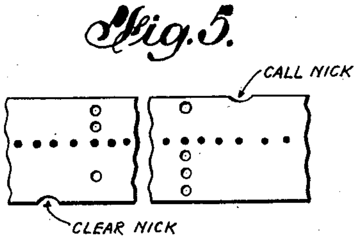
Figs. 5 and 6 are sketches illustrative of the marking of the tape and of its passage through the transmitter.
Figure 6:
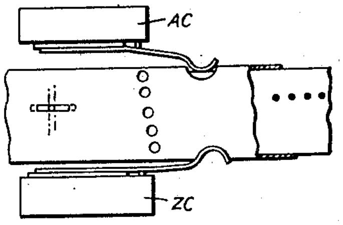

There will first be given a general description of the functioning of the out-station equipment in the sending of a message, this being made with more particular but not necessarily exclusive reference to Fig. 1; and then there will be given the corresponding detailed description with reference to Figs. 2 to 4.

The teleprinter keyboard perforator is provided with two extra but otherwise normal keys, a key AK for operation at the "start of message" (call)

and a key ZK for operation at the "end of message" (clear).

One key may perforate a nick in one edge of the tape and the other key a nick in the second edge of the tape, while the automatic transmitter may be provided with two switches, one to close when the "call" nick is detected and the second to close when the "clear" nick is detected:

The perforated tape prepared by the keyboard perforator is fed into an associated teleprinter automatic transmitter and allowed to pass freely through it.

When a nick indicating "start of message" (call) is recognized by the automatic transmitter, the effect is to stop the passage of tape and call the exchange.

After an interval the exchange sends back the "proceed to dial" signal which, via the control circuit, causes the automatic transmitter to send the digits of the wanted station into the control circuit in teleprinter code. The control circuit passes these signals into a local teleprinter and into a storage circuit. The digits are set up, still in teleprinter code, in the storage circuit, and are also passed to the converter circuit which translates them as received into digital impulse trains suitable for operating selector switches and sends them out to line via the control circuit. These impulse trains are utilized by the exchange in known manner to set up the desired connection, and when the connection is set up to a station that station sends back its call number in teleprinter code by means of its answer-back mechanism, which may operate either automatically as soon as the connection is set up or in response to a "Who are you?" signal from the exchange.

These called-station identity signals are passed back through the exchange to the calling station, where they are directed by the control circuit into the storage circuit for comparison with the stored signals and into the local teleprinter for record. If the stored signals and the answer-back signals agree, the control circuit allows the automatic transmitter to proceed with the text of the message, and causes the storage circuit and receiving teleprinter to drop out of circuit. If the answer-back signals do not agree with the stored signals, this disagreement is taken to indicate that an intermediate teleprinter receiving point is taking the message (as provided for in the type of exchange under consideration); then the control circuit first causes the destination signals to be transmitted, this time in teleprinter code, and then allows the message to be transmitted, at the same time monitoring the teleprinter receiver in circuit to print a copy of the message in case it gets lost in its routing. Also an "alarm" indication may be given. For instance, a copy of all messages could be taken by the receiving teleprinter and the "alarm" device could actuate a ribbon change mechanism, to indicate, in one colour of printing, which messages have reached the required destination and, in other colour of printing, which messages have been taken at an intermediate point.

At the end of the message, the automatic transmitter recognizes the perforation indicating the "end-of-message" signal, which causes the control circuit to send a clear signal to the exchange. The perforated tape is allowed to continue feeding into the automatic transmitter until the next message is reached, when similar functions to those described above are repeated.

*Detailed description*

Referring to Fig. 2, the control circuit and the auto-transmitter circuit comprise the receive line RL (connected to a receive relay RR), the send line SL, the auto-transmitter sending contacts XC, the call and clear contacts AC and ZC and the transmitter detent release magnet DXM.

The storage circuit shown in Figs. 3 and 4 comprises a telephone uniselector switch, having seven arcs of twenty-five contacts, the arcs being labelled L1 to L7 and the driving magnet labelled LDM. The storage circuit also contains an arhythmic distributor, consisting of a brush BR, which is driven at a speed of one revolution in the duration of one complete arhythmic combination. This brush sweeps over three concentric distributor rings, CR, SR, and TR. Ring CR is electrically continuous. Ring SR is so divided that the sum of all segments represents a complete arhythmic signal and each segment represents one signal element; thus, there will be the start, first, second, third, fourth, fifth and stop segments. The stop segment has a small insulated portion, on which the brush rests when not in action. Ring TR is not connected, except for a portion of the same length as and in phase with the stop segment of ring SR. The brush BR is allowed to make one revolution when the electro-magnet DEM is energized.

In this description, which has been presented in tabular fashion so far as is practicable, the references to relays use capital letters for the windings and small letters for the contacts. When the relay is operative the word "up" has been added to the contacts-reference.

*Call to exchange*

Because the auto-transmitter detent release magnet DXM is de-energised, tape is being fed into the transmitter from the keyboard perforator. The first indication which the transmitter receives from the tape that a message is coming is the arrival of the "call signal nick" beneath the appropriate feeler. This closes the call contacts AC in the transmitter, and in the control circuit: relay C operates: +, AC, C, ***d*2, —; and locks: +, *c*2 up, C *d*2, —; magnet DXM energizes: +, *f*1, *c*1 up DXM, —; and tape-feeding stops. A call signal is sent to the exchange: call generator AG, *c*3 up, *g*2**, send line and the equipment waits.

*Sending the wanted station number in normal impulses*

In due course a proceed-to-dial signal comes back from the exchange over the receiver line, and relay RR operates: relay F operates momentarily: +, *rr* on space, rectifier RT, condenser, ***a*2**, F, —; relay G operates: +, *rr* on space, RT, ***g*1, G, *d*3, —; and locks: +, *g*1 up, G, *d*3, —. The send line is connected to a keysender sending contacts: KSC, *a*4, *g*2 up, send line. Magnet DXM is momentarily de-energized: *f*1 up and the auto-transmitter is released to make one revolution for the sending of one signal, at the same time magnet DEM is momentarily energized: —, *d*3, lead DEM to Fig. 3, DEM, *f*2 up, +; and brush BR of the distributor is released to make one revolution simultaneously with the auto-transmitter. Thus the transmitter reads the first character perforated in the tape (being the "figures shift" signal) and transmits it both to the distributor: XC, *k*2, *c*4 up, *a*1, lead CR, distributor ring CR, and to the local teleprinter: to *a*1, *k*3**, TPR. Of the first, figures-shift signal, the start element and five signal elements are passed via segments SR of the distributor to the brushes L2 to L7 of the switch L, but are there ineffective because these these brushes in position 1 stand on blank contacts. On the other hand the stop element is effective, and relay RDM operates: magnet LDM energizes: *rdm1* up; and the switch L steps to position 2. Relay F operates momentarily: +, bank and wiper L2 in position 2, lead L2, F, —; de-energizing magnet DXM and energizing magnet DEM, both momentarily as before, so that the auto-transmitter reads the second character in the tape (being the hundreds digit, say "4," of the wanted station number) and transmits it to the distributor; the distributor in turn passes it into storage. Thus the five elements of digit "4" are

| 1 | 2 | 3 | 4 | 5 |
|---|---|---|---|---|
| S | M | S | M | S |
| + | — | + | — | + |

and are passed severally over segments 1 to 5 of distributor ring SR to wipers L3 to L7 of switch L, contacts 2 of the respective banks being connected to negative over *d1*. The following relays will in consequence operate

| | | |
|---|---|---|
| HA | HC | HE |
| HV | HX | HZ |

The upper set, HA to HE, lock and constitute the storage means. The lower set, HV to HZ, have contacts in a chain circuit in the converter portion of Fig. 4, so that a key-sender solenoid SO4 is energized, and the digit "4" is transmitted to line in the form of impulses of the type conveniently usable in the exchange for the setting of a selector switch: +, key-sender contacts KSC, *a4*, *g2* up, send line. Relay SH is operative throughout sending. Magnet RDM energises to the stop element in the character and remains energized so long as relay SH is operative, but finally releases. Switch L steps to position 3; LDM energizing and releasing and again relay F operates momentarily, so that in similar manner as before, the tens digit is passed into storage on a selection of relays TA to TE, and to the key-sender by a similar selection of relays HV to HZ. In the same manner, in position 4 of switch L, the units digit is stored on relays UA to UE and fed to the key-sender by means of relays HV to HZ. In response to the stop-element in the units digit, switch L goes to position 5; but this time there is no momentary operation of relay F over wiper and bank L2. Relay A operates: L1 in position 5.

*Answer back from wanted station*

The calling station equipment now remains quiescent while the exchange endeavours to set up the connection in response to the three digits that it has received in the form of normal digital impulse-trains. The exchange having set up the connection, it sends a "Who are you" signal in known manner, and the answer-back unit at the station to which connection has been made sends back the station identity consisting of the "figures shift" signal followed by three digits in teleprinter code. This answer-back signal passes through the exchange to the calling station. Upon receipt on relay RR of the start element of the first (figures-shift) signal, magnet DEM energizes momentarily: +, *rr* on space, *a3* up, lead L2, wiper L2, contact 5 of bank L2, DEM, lead DEM, *d3*, —; and the distributor starts to make one revolution. The signal elements of the figures-shift have no effect; but on receipt of the stop element relay RDM operates: —, *rr*, *a3* up, B, *a1* up, CR lead, ring CR, brush BR, segments SR stop, RDM, + (ground) (relay B will not energize in series with RDM) and energizes magnet LDM so that switch L steps to position 6. The second character to be received is the first digit of the station number to which connection has been made. It will first be assumed that the said station is itself the wanted station, so that the number received back is the same as that stored, and the first digit of this number is "4." On receipt of the start element of this first digit, magnet DEM energizes and the distributor makes one revolution, exactly as before. Then the successive signal elements are received and are passed over the wipers and banks L3 to L7 of switch L to contacts *ha2* to *he2*. If these successive signal elements are S M S M S, then there is no such operation of relay B as will be described later. The reception of the tens and units digits, and their comparison with the stored values, follows similarly. On receipt of the step element in the units digit, switch L steps to position 9. Relay A releases: L1. Relay D operates: —, wiper L1, contact L1 (9) *b3*, D, +; and all the storage relays HA to HE, TA to TE, UA to UE, release: *d1* up; relay C releases: *d2* up; relay G releases: *d3* up; relay RDM operates: —, *d3* up, lead L2, wiper and bank L2, *k6*, RDM, and switch L steps round to position 25.

*Message sending*

The auto-transmitter contacts XC are now connected to the send line: XC, *k2*, *c4*, *e1*, send line magnet DXM de-energizes: *c1*, so allowing the auto-transmitter to transmit the complete message text as it appears on the tape; the local teleprinter TPR being disconnected at *c4*.

*Release*

At the end of the message-sending, the "clear nick" in the tape causes the clear contacts ZC to be closed, and relay E operates. The clear signal is connected to the line: clear generator ZG, *e1* up, send line. Relay RDM operates: *e2* up, and switch L steps to position 1. Relay D releases: L1 leaving position 25 and restores the circuit to normal. The machine continues to feed tape until the next message is reached.

*Answer back from an intermediate storage station*

In this case the answer back signals will differ from those stored on relays HA to HE, TA to TE, UA to UE. Consequently, when the comparison is made over wipers and banks L3 to L7 in any of positions 6, 7 and 8, relay B operates: + or —, *rr a3* up, B, *a1* up, lead CR, ring CR, brush BR, segment of SR, relay H, wiper and bank of L. *ha2* or *ta2* or *ua2*, — or +. When the answer back signals have been completely received, the switch L will stand in position 9. Relay K operates: —, wiper L1 and contact L1 (9), K, *b2* up, +; and the teleprinter TPR is switched to the send line: TPR, *k3* up, *k1* up. Relay RDM operates: *k4* up, wiper L2 and contact L2 (9), *k6* up, RDM; and switch L steps to position 10. Magnet DEM energizes: *k4* up, wiper L2 and contact L2 (10), DEM, *d3*; thus releasing the distributor to send the hundreds digit in teleprinter code; + or —, contacts *ha2* to *he2*, contacts L3 (10) to L7 (10), wipers L3 to L7, HV to HZ, segments 1 to 5 of ring SR, brush BR, segment CR, *a1*, *c4* up, K2 up, send line. Similarly with switch L in position 11, the tens digit is sent, and with switch L in position 12, the unit digit is sent. Thus the message, as it is going to be stored at an intermediate station, is prefixed with its destination number in teleprinter code. The switch L then steps to position 25. Relay D operates: L1 (25), b3 up, D and starts the transmission of the message, at the same time recording it on the local teleprinter: XC, d4 up, k2 up to line, and to k1 up, k3 up, TPR. The clear signal nick, as before, closes contacts ZC, so that relay E operates and releases the circuit.

It will be understood that the circuits which have been shown in the drawings and described are capable of modification and elaboration. For example in the translation of the destinaation digits from teleprinter code to impulse-trains, provision may be made for the introduction of routing digits as well as or in place of the destination digits, thus permitting routing in the manner of the director system of automatic telephony. Again, it may be desired to use voice-frequency currents for impulsing and to precede each impulse train with a prefix signal as described in my prior British Patent No. 512,827, supra. Such facilities can readily be provided.

What is claimed is:

1. In an automatic teleprinter exchange system comprising a plurality of called stations, at least one intermediate station and a calling station adapted to be connected to one of said called stations directly or to said intermediate station, and routing means for establishing connections between said stations in response to destination-indicating signals sent out by said calling station, in combination, message transmitting means at said calling station adapted to transmit a message prefixed with said destination-indicating signals, receiving means at said called stations and intermediate stations for receiving said signals over the connections established by said routing means, transmitting means at said called and intermediate stations for transmitting an answer back identity signal in response to signals received from said calling station, storage means at said calling station operative to store said destination-indicating signals prior to their transmission to said called stations, means included in said storage means being responsive to said answer back signals for comparing these signals with said stored signals and switch means at said storage circuit under the control of said comparison circuit being operative to deactivate said storing means when a direct connection to a predetermined called station is established, said connection being indicated when said received answer back signal corresponds to said stored destination indication signal, said switching means being further operative in response to answer back signals from an intermediate station to actuate said transmitting means for sending out signals representative of said stored signals when said received signals do not correspond to said stored signals indicating that said intermediate station will receive the message.

2. The combination according to claim 1 wherein said signal transmitting means at said calling station, comprises a sending device adapted to transmit signals in teleprinter code, said device being arranged to operate said storing means in response to said destination-indicating signals, digital impulse generator means responsive to said storing means for sending out digital impulses representative of the setting of said storing means, and wherein said transmitter means for sending out signals representative of the stored signals when the received signals do not correspond to said stored signals comprises means to send out teleprinter code signals representative of the setting of said storing means.

3. In an automatic teleprinter exchange system comprising a plurality of called stations, at least one intermediate station and a calling station adapted to be connected to one of said called stations directly or to said intermediate station, in combination, an automatic teleprinter transmitter at said calling station, tape feeding means for controlling said transmitter for the transmission of a message recorded in a tape, tape perforating means for impressing on said tape in succession, a beginning-of-message mark, a set of destination-indicating characters, a series of message characters and an end-of-message mark, "call" and "clear" detector means responsive to said beginning-of-message mark and to said end-of-message mark, respectively, call signal generator means adapted to send a call signal to control the establishment of a connection to said called stations under the control of said "call" detector means, means for establishing said connection, means at said called stations and at the intermediate station for sending an acknowledge signal in response to said call signal, signal receiving means at said calling station, signal storing means at said calling station, signal transmitting means connectable to said signal storing means under the control of said "call" detector for setting said storing means in accordance with said destination-indicating characters in said tape, digital impulse generator means controllable by said storing means and actuatable by said receiving means to send to the called station or intermediate station a digital signal representative of the setting of said storing means in response to said acknowledgement signal, detent means at said calling station adapted to inactivate said tape feeding means until an identification signal is received from said called station or intermediate station, means at said called station and intermediate station for sending a digital identification signal in response to said destination-indicating signal from said calling station, a comparison circuit in said storing means for comparing said stored signals with said identification signal from said called station or from said intermediate station, switch means at said calling station under the control of said comparison circuit adapted to restore said storing means to normal when said identification signal agrees with said stored signal for the called station indicating a direct connection to said called station, said switch means being further operative to actuate said transmitting means for sending out teleprinter code signals corresponding to said destination-indicating characters when said identification signal does not agree with said stored signals for a called station but receives an identification signal from an intermediate station thereby indicating a connection to said intermediate station and means including said "clear" detector for transmitting said message and restoring said calling station to normal after said switch means has operated.

4. The combination according to claim 3 wherein said calling station further comprises a local teleprinter, said switch means being adapted to connect said teleprinter to said signal transmitting means for the recording thereon of said teleprinter code signals when said return signal does not agree with said stored signal.

5. The combination according to claim 3 wherein said signal storing means comprises a set of storage relays, a multi-bank uniselector switch having contacts of different banks connected to respective ones of said storage relays, and a distributor adapted to connect the wipers associated with said banks successively to said signal transmitting means.

6. The combination according to claim 5, comprising a plurality of additional relays in series with respective ones of said wipers, said additional relays having contacts adapted for the selective actuation of said digital impulse generator means.

7. The combination according to claim 3, wherein said comparison circuit comprises a control relay, said storing means comprises a set of storage relays and said signal transmitting means comprises a sending relay, further comprising distributor means for successively connecting said control relay between an armature of said sending relay and the armatures of respective storage relays, each of said armatures having associated therewith a pair of contacts respectively connected to positive and negative potential.

LESLIE STAMPE MUNCK.

REFERENCES CITED

The following references are of record in the file of this patent:

UNITED STATES PATENTS

| Number | Name | Date |
|---|---|---|
| 1,872,842 | Storch | Aug. 23, 1932 |
| 2,088,750 | Kinkead | Aug. 3, 1937 |
| 2,193,967 | Kleinschmidt | Mar. 19, 1940 |
| 2,242,196 | Thompson | May 13, 1941 |
| 2,381,871 | Bacon | Aug. 14, 1943 |

FOREIGN PATENTS

| Number | Country | Date |
|---|---|---|
| 466,673 | Great Britain | June 2, 1937 |
| 479,314 | Great Britain | Feb. 3, 1938 |
| 512,827 | Great Britain | Sept. 26, 1939 |